Nov. 12, 1929.  A. F. MASURY  1,735,404
WHEEL MOUNTING
Filed April 20, 1928  2 Sheets-Sheet 1
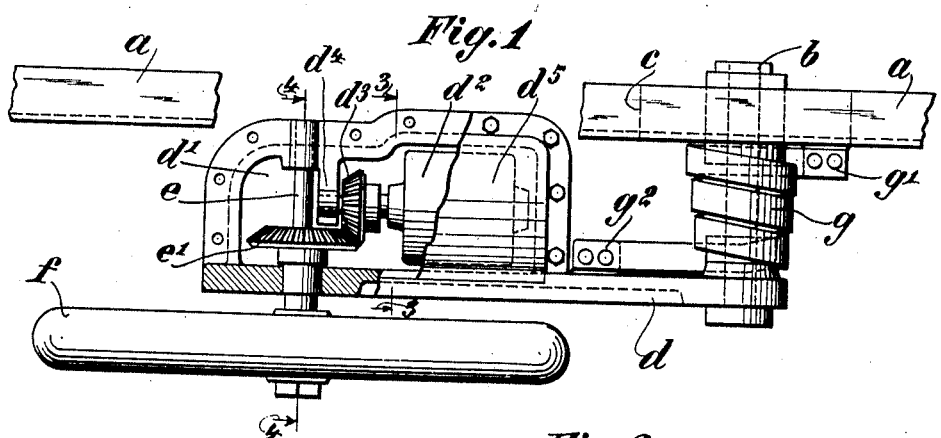
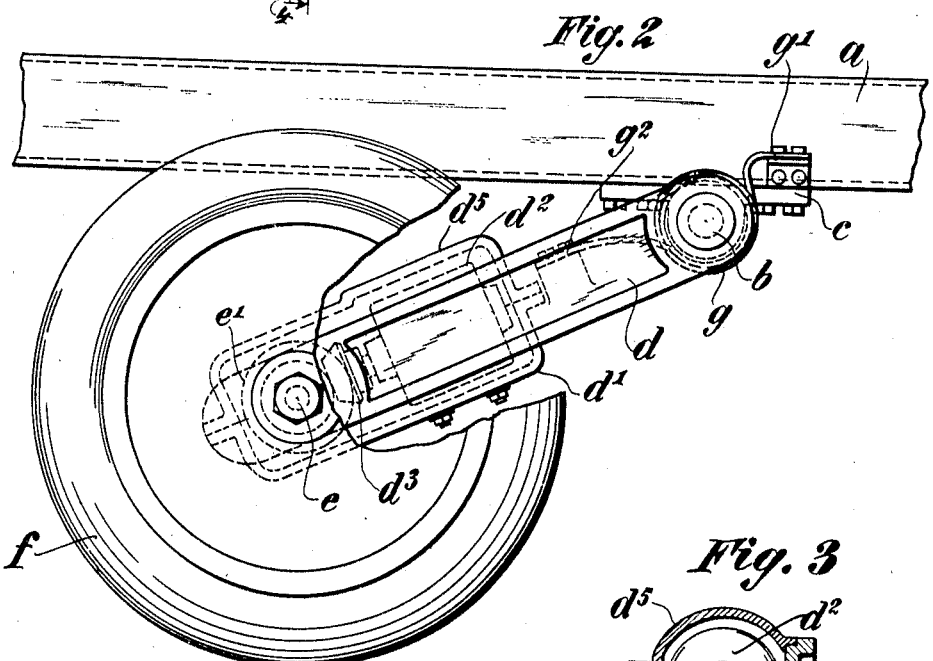
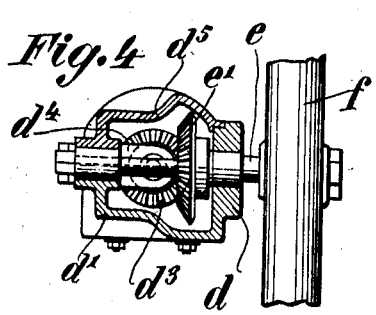
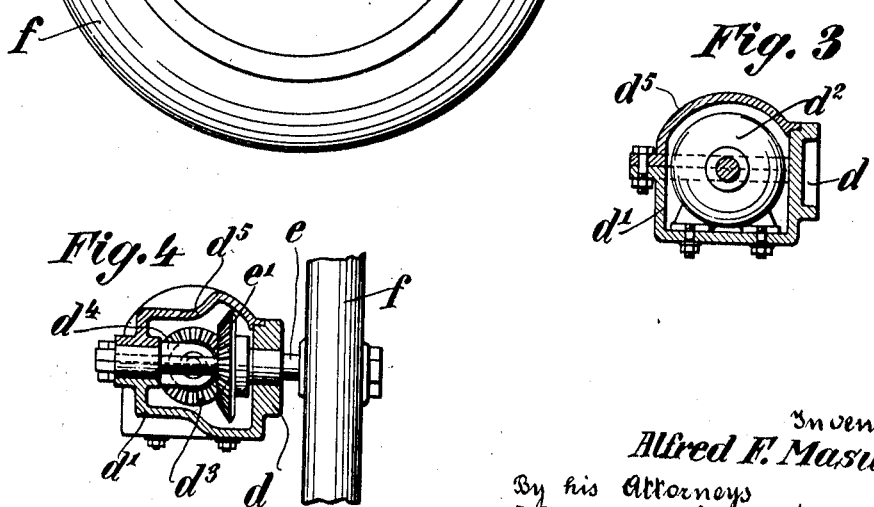
Inventor:
Alfred F. Masury,
By his Attorneys
Redding, Greeley, O'Shea & Campbell

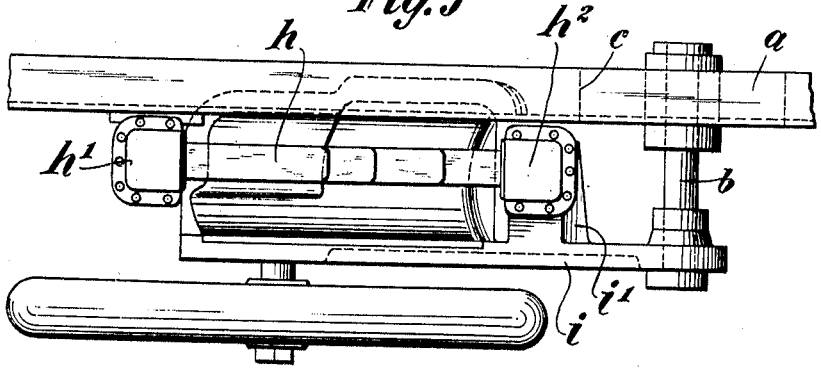
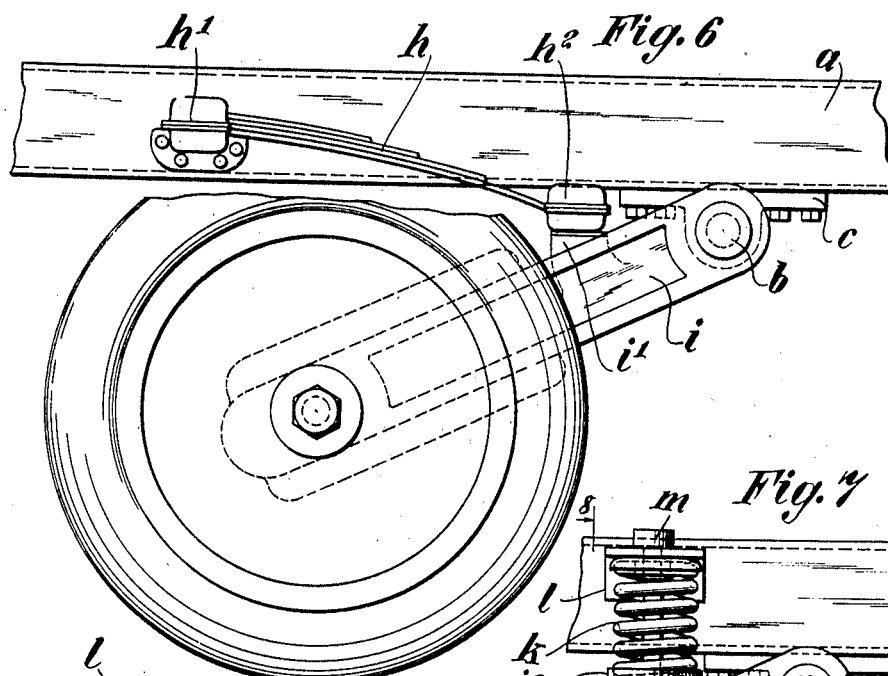
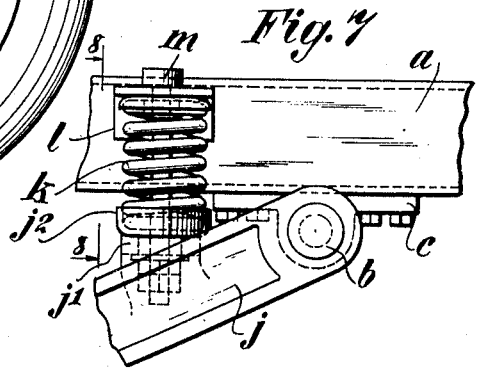
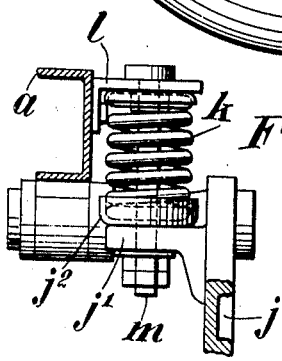

Patented Nov. 12, 1929

1,735,404

UNITED STATES PATENT OFFICE

ALFRED FELLOWS MASURY, OF NEW YORK, N. Y., ASSIGNOR TO INTERNATIONAL MOTOR COMPANY, OF NEW YORK, N. Y., A CORPORATION OF DELAWARE

WHEEL MOUNTING

Application filed April 20, 1928. Serial No. 271,446.

The present invention relates to vehicle constructions, particularly the driving elements. With the modern trend of vehicle construction toward low and wide bodies for city service, the problem of mounting the driving wheels has received considerable attention. For a given diameter of wheel, the height of the frame from the roadbed is limited by the through axle of existing constructions which extends across the frame.

This invention contemplates a radical departure from existing designs in that the through axle is dispensed with entirely. It is proposed to mount the individual wheels as independent units at the sides of the frame and provide individual driving means, such as electric motors, for driving the respective wheels. In this manner, there are no cross members which limit the clearance between the roadbed and the frame. A further advantage in this construction lies in the fact, that being independent elements, the various wheels and driving means can be removed as a unit with great facility and ease of repair and maintenance is thus provided.

The invention will be understood more fully from the following description when read in connection with the accompanying drawings, wherein:

Figure 1 is a plan view, partly broken away and in section, of one form of wheel mounting.

Figure 2 is a view in side elevation, partly broken away showing the wheel mounting of Figure 1.

Figure 3 is a view in section, taken on line 3—3 of Figure 1, and looking in the direction of the arrows.

Figure 4 is a view in section, taken on line 4—4 of Figure 1, and looking in the direction of the arrows.

Figure 5 is a plan view of a modified form of the invention.

Figure 6 is a view in side elevation, partly broken away, showing the wheel mounting of Figure 5.

Figure 7 is a view in side elevation of a further modified form.

Figure 8 is a view in section taken on line 8—8 of Figure 7, and looking in the direction of the arrows.

Referring to Figures 1, 2, 3 and 4, $a$ indicates a vehicle frame to which is secured a stub shaft $b$ by means of a suitable bracket $c$. Pivoted at the end of the stub shaft is a wheel bracket $d$, carrying at its remote end a jack shaft $e$, upon the outer end of which is mounted a wheel $f$.

The wheel bracket $d$ is formed with a motor housing $d'$ carrying a suitable electric motor $d^2$ having a driving pinion $d^3$. The armature shaft may be mounted in a bracket $d^4$ suitably formed in the housing $d'$, and a bevel gear $e'$ meshes with the driving pinion $d^3$ to drive the jack shaft $e$.

In order that the shocks and vibrations incident to operation will not be impressed upon the frame, a suitable spring $g$ (in this instance, a coiled spring) is mounted upon the stub shaft $b$ and secured at one end $g'$ to the vehicle frame and at the other end $g^2$ to the wheel bracket $d$. A suitable closure $d^5$ is provided for protecting the motor and driving elements within the housing $d'$.

In the form shown in Figures 5 and 6, the coil spring $g$ is replaced by a leaf spring of the cantilever type $h$. This spring is rigidly mounted at one end upon the frame at $h'$ and the free end is preferably mounted in a suitable cushioning element $h^2$. This element is mounted upon a platform $i'$ formed on the wheel bracket $i$. It will be seen that pivotal movement of the wheel bracket $i$ with respect to the stub shaft $b$ will be yieldingly resisted by the cantilever spring $h$.

In the form shown in Figures 7 and 8, a coil spring of the compression type is substituted for the springs described above. The platforms $j'$ formed on the wheel brackets $j$ carry seats $j^2$ for receiving a compression spring $k$. A bracket $l$ mounted upon the channel $a$ seats the other end of the spring $k$ and a bolt $m$ serves to connect the elements and prevent excess movement therebetween.

It will be apparent that further modifications and arrangments of the elements may be made and the invention is not to be limited, save as defined in the appended claims.

I claim as my invention:

1. A wheel mounting comprising a vehicle frame, a wheel, a wheel bracket, means for mounting the bracket pivotally upon the frame, spring means mounted between the bracket and frame, a jack shaft mounted in the bracket, a wheel driven by the jack shaft, a housing formed with the bracket, an electric motor in the housing, and driving means between the motor and wheel.

2. A wheel mounting comprising a vehicle frame, a wheel, a wheel bracket, a stub shaft carried by the frame and mounting the bracket pivotally thereon, a jack shaft journalled in the bracket and mounting the wheel, a housing formed on the bracket, an electric motor in the housing, driving means between the motor and jack shaft, and a spring between the frame and bracket.

This specification signed this 16th day of April, A. D. 1928.

ALFRED FELLOWS MASURY.